Figure 1:
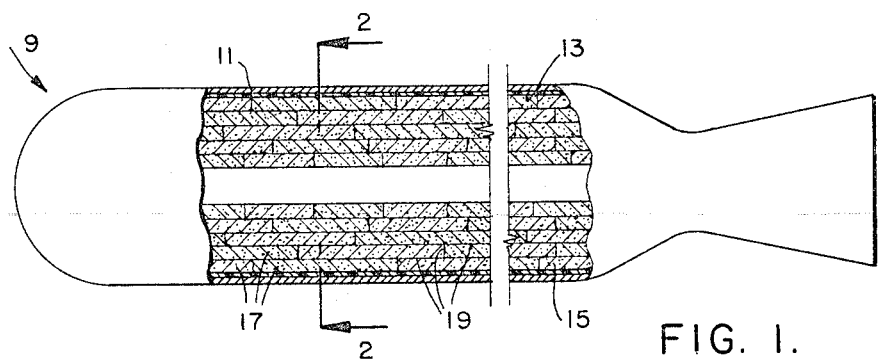

Oct. 4, 1966   L. R. DALLETT   3,276,379
BONDING MATERIAL FOR PROPELLANT GRAINS
Filed June 8, 1962

INVENTOR.
LAWRENCE R. DALLETT
BY
P. H. Firsht
ATTORNEY.

United States Patent Office 3,276,379
Patented Oct. 4, 1966

3,276,379
BONDING MATERIAL FOR PROPELLANT GRAINS
Lawrence R. Dallett, Sacramento, Calif., assignor to the United States of America as represented by the Secretary of the Navy
Filed June 8, 1962, Ser. No. 202,353
4 Claims. (Cl. 102—98)

The invention described herein may be manufactured and used by or for the Government of the United States of America for governmental purposes without the payment of any royalties thereon or therefor.

The present invention relates to a bonding agent for solid grain rocket propellants, and more particularly it relates to a method for building a solid propellant grain from a plurality of segments of propellant material, said segments being bonded or cemented together with an adhesive material which is itself of the same composition as that of the propellant binder.

Rocket motors utilizing solid propellant may be classified in several categories depending on their size, shape and/or configuration, and on their utility. The present invention relates generally to those rocket motors utilizing large sustainer propellant charges having relatively long burning durations and capable of imparting high total impulse. It is generally not feasible to extrude or cast a single large grain of propellant material having weights in excess of 6,000 pounds. These large propellant charges can be made by building up a plurality of small blocks or segments of propellant material to form a large propellant charge which for all intents and purposes acts as a single grain. Fabricating the large propellant charge in this manner permits a more thorough and rigid inspection of the charge for cracks, fissues or other imperfections. Also the shape, size, burning rate and other performance characteristics may be varied.

There are two major classes of solid propellants in current use: the double-base and the composites. By definition the double-base propellants have as their principal constituents, two completely independent consumable or explosive materials which are worked together to produce a colloidal mixture. These two ingredients are generally nitrocellulose and nitroglycerin. Each of these materials (and therefore, the mixture) contains both fuel and oxidizer, and the double-base propellants, therefore, do not contain discrete fuel and oxidizer particles dispersed in a matrix, as do the composites. By definition, the composite propellants are those in which the fuel and oxidizers are discrete, separate chemical substances in close physical contact with each other. Unlike the double-base propellants which are homogeneous, the composite propellants are distinctly heterogeneous, consisting essentially of one or more solid phases suspended in a rubbery matrix (the binder). Most present-day composite propellants use powdered aluminum as a fuel, and ammonium perchlorate, potassium perchlorate or ammonium nitrate as the oxidizer. The size limitations of extruded grains imposed by the processing equipment available has made it necessary to devise some method of fabricating large grain propellants for the large missiles. Segments or blocks of propellant grain have been cast or extruded and cemented together to form large propellant grains.

Building large propellant grains from a plurality of segments requires the use of some type of bonding agent or adhesive for bonding together contiguous surfaces of the segments of the propellant. The bonding agent should be combustible and have a sufficiently high burning rate so that the burning or consumption of the propellant mass will proceed from one segment of the propellant to the next without slowing down when the progressively generated burning surface encounters the bonding agent.

Accordingly, the general purpose of this invention is to provide an adhesive which is itself a propellant and hence contributes energy to the system.

An object of the present invention is to provide a bonding agent and method of application for fabricating large solid propellant grains.

Another object is to provide a solid propellant grain built up from a plurality of segments, said segments being bonded together with a bonding agent which is itself a propellant and of the same composition as the propellant grain binder.

A further object is to provide a solid propellant charge built up from a plurality of segments or grains of propellant material bonded together in such a manner and with such a cement that burning of the propellant material will proceed progressively and unimpeded from one section or segment to the next.

Further objects and advantages of this invention will become apparent to those skilled in the art from the following discussion and accompanying drawing.

Figure 2:
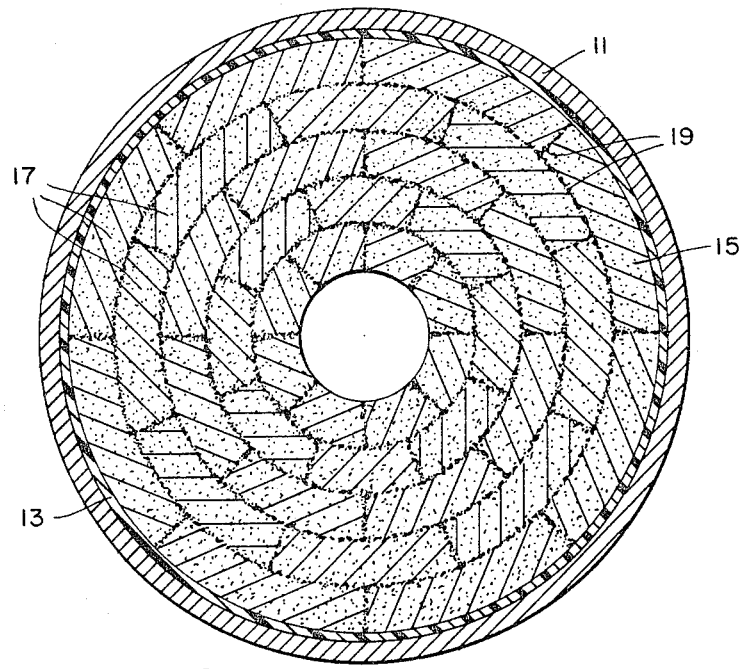

FIG. 1 is a view of a rocket motor loaded with a large segmented charge, the individual segments of which are bonded together according to the present invention; and FIG. 2 is a cross section of FIG. 1 taken along plane 2—2.

Referring now to the drawing, FIG. 1 shows a rocket motor generally designated 9, having cylindrical casing or housing 11 defining a combustion chamber in which is loaded a large cylindrical propellant grain designated 15 having an internal perforation and which is case-bonded with any suitable adhesive 13 to the inner wall of casing 11. Grain 15 comprises a plurality of segments 17 each of which is bonded together at their contiguous surfaces with the bonding agent 19 of this invention, a detailed description of which follows; segments 17 being arranged so as to provide an exposed burning surface which defines said internal perforation.

The adhesive or bonding agent 19 used in this particular grain assembly is of the same composition as the binder used in preparing the propellant grain. In operation, this invention utilized the binder of a typical Nitrasol propellant, which is the name for a group of propellants developed at the U.S. Naval Ordnance Test Station, China Lake, California, and which are described in patent application Ser. No. 761,448, filed Sept. 16, 1958.

A typical Nitrasol propellant has the following composition:

| Ingredient | Chemical Name | Percentage | Function |
|---|---|---|---|
| PNC | Plastisol nitrocellulose | 15 | Fuel. |
| PETriN | Pentaerythritol trinitrate. | 35 | Forms binder with PNC, the Material is a high energy plasticizer. |
| Al | Aluminum | 15 | Energy contributor and fuel. |
| $NH_4ClO_4$ | Ammonium perchlorate | 35 | Oxidizer. |
| | Resorcinol | 1 | (Added) stabilizer. |

The binder for the Nitrasol propellant consists of a mixture of from about 15 to 85 percent high energy plasticizer, zero to 20 percent inert plasticizer, and about 10 to 50 percent plastisol nitrocellulose. The high energy plasticizer is one selected from the group consisting of primary and secondary nitrate esters both liquid and solid. The nitrocellulose is converted to tiny hard dense spheres (of the order of 10 microns diameter) which are then suspended at elevated temperatures in a plasticizer to form a rubbery binder. The preferred high energy plasticizers include PETriN (pentaerythriol trinitrate), DEGN (diethylene glycol dinitrate), TMETN (trimethylolethane trinitrate) or any mixture of them.

The inert plasticizers are conventional and may or may not be added to modify ballistic and physical properties. Dibutyl phthlate is commonly employed as such a plasticizer.

The segments or blocks for forming large grain propellants are cast or extruded to appropriate size and shape. They are tested by nondestructive methods and the defective ones discarded. The segments or blocks are then assembled around a mandrel or in a jig and the binder material of the propellant composition acting as the adhesive or bonding agent in this invention is forced into the seams with moderate pressure (5–10 p.s.i.). When the seams or contiguous surfaces are coated, the assembly is held until the adhesive is cured. An oven maintained at 179–180° F. speeds up the curing process. The grain is now ready to be stored or mounted in the missile motor.

The binder material used as a bonding agent or cement can be made with a viscosity range of from 5 to 30 poises and will cure at temperatures between 160–180° F. to rubbery solids. Such compositions contain no volatile solvent to be removed and are sufficiently fluid in the uncured state to flow readily.

A chief advantage of the invention is the fact that it produces a strong, large grain free of cracks and fissures and with increased energy per volume of grain depending, of course, on the number of segments. In other words, when the inert adhesive previously used is replaced by the present propellant adhesive which is the same composition as the green segments being bonded together, the energy loss is reduced to negligible portions.

In the manufacture of large grains either by extrusion or by casting, when cracks or deformities are found in the grain upon inspection it becomes necessary to discard the entire grain, resulting in a loss of large amounts of propellant. When constructing large grains according to the present method it is necessary to discard only the defective segments rather than the completed grain.

Furthermore, large grains can be fabricated in sections and transported to the point of use and bonded together with the uncured binder composition. The large grains are now ready for loading in the rocket motor without the loss of energy experienced heretofore when an inert cement agent was utilized.

Obviously many modifications and variations of the present invention are possible in the light of the above teachings. It is therefore to be understood that within the scope of the appended claims the invention may be practiced otherwise than as specifically described.

What is claimed is:

1. A solid propellant grain having a cylindrical configuration with an axial perforation said grain consisting of a plurality of segments of propellant consisting of dense, spherical nitrocellulose, pentaerythritol trinitrate, aluminum, ammonium perchlorate and resorcinol, said segments being bonded together at their contiguous surfaces with a bonding agent consisting essentially of said nitrocellulose and said pentaerythritol trinitrate.

2. In a rocket motor, a prepellant charge having an axial perforation comprising a plurality of solid propellant segments, consisting of about 35 percent inorganic oxidizer, about 15 percent metal powder, about 15 percent nitrocellulose and about 35 percent plasticizer, said segments being bonded at their contiguous surfaces with a bonding agent and being arranged so as to provide an exposed burning surface which defines said perforation, said bonding agent consisting essentially of nitrocellulose suspended in a plasticizer; said nitrocellulose being dense, hard spheres of the order of 10 microns in diameter.

3. A solid propellant grain having a cylindrical configuration and an internal perforation, said grain composed of a plurality of blocks of propellant of the Nitrasol type consisting of ammonium perchlorate and aluminum mixed in a binder consisting of hard, dense spheres of nitrocellulose suspended in pentaerythritol trinitrate, said blocks being cemented at their contiguous surfaces by said binder.

4. An article of manufacture consisting of a cylindrical, large diameter, internal-perforated propellant grain consisting of a plurality of segments having mating surfaces secured together by a bonding agent so as to form an exposed burning surface which defines the internal perforation; said propellant grain consisting essentially of 15% by weight nitrocellulose composed of dense, hard spheres in the order of 10 microns, 35% by weight pentaerythritol trinitrate, 15% by weight aluminum, and 35% by weight ammonium perchlorate; said bonding agent consisting of from about 15 to 85% by weight of pentaerythritol trinitrate and from 10 to 50% by weight of said spherical nitrocellulose.

References Cited by the Examiner
UNITED STATES PATENTS

| | | | |
|---|---|---|---|
| 2,985,055 | 5/1961 | McMichael | 86—1 |
| 3,008,417 | 11/1961 | Keathley et al. | 102—98 |
| 3,010,354 | 11/1961 | Adelman | 86—1 |
| 3,010,400 | 11/1961 | Guay | 102—98 |
| 3,031,969 | 5/1962 | Collard et al. | 102—98 |
| 3,032,970 | 5/1962 | Fox | 60—35.3 |
| 3,054,353 | 9/1962 | Rumpp et al. | 102—98 |

OTHER REFERENCES

"Solid Fuel Industry Round-up," Missiles and Rockets Magazine, vol. 2, No. 8, August 1957, p. 71 required.

Military Explosives, Department of Army, Apr. 14, 1955, p. 247 required.

BENJAMIN A. BORCHELT, *Primary Examiner.*

SAMUEL BOYD, SAMUEL FEINBERG, *Examiners.*

R. F. STAHL, *Assistant Examiner.*